(12) United States Patent
Bagley et al.

(10) Patent No.: US 8,694,893 B2
(45) Date of Patent: Apr. 8, 2014

(54) INTERACTIVE PRODUCT CONFIGURATOR WITH PERSISTENT COMPONENT ASSOCIATION

(75) Inventors: Claire M. Bagley, Carlisle, MA (US); Gao Chen, Malden, MA (US); Martin P. Plotkin, Concord, MA (US)

(73) Assignee: Oracle International Corporation, Redwood Shores, CA (US)

( * ) Notice: Subject to any disclaimer, the term of this patent is extended or adjusted under 35 U.S.C. 154(b) by 1290 days.

(21) Appl. No.: 12/258,862

(22) Filed: Oct. 27, 2008

(65) Prior Publication Data

US 2010/0037162 A1    Feb. 11, 2010

Related U.S. Application Data

(60) Provisional application No. 61/087,254, filed on Aug. 8, 2008.

(51) Int. Cl.
*G06F 15/177* (2006.01)

(52) U.S. Cl.
USPC ........... 715/747; 705/7.25; 705/26.5; 705/29; 715/700; 715/733; 715/744

(58) Field of Classification Search
None
See application file for complete search history.

(56) References Cited

U.S. PATENT DOCUMENTS

| | | | |
|---|---|---|---|
| 5,576,965 A | 11/1996 | Akasaka et al. | |
| 6,609,108 B1 | 8/2003 | Pulliam et al. | |
| 6,937,997 B1 | 8/2005 | Parulski | |
| 7,010,746 B2 | 3/2006 | Purvis | |
| 7,051,032 B2* | 5/2006 | Chu-Carroll et al. | 1/1 |
| 7,069,537 B2 | 6/2006 | Lazarov | |
| 7,236,983 B1 | 6/2007 | Nabors et al. | |
| 7,333,968 B2 | 2/2008 | Geller et al. | |
| 7,558,790 B1* | 7/2009 | Miller et al. | 1/1 |
| 7,584,079 B2 | 9/2009 | Lichtenberg et al. | |
| 7,650,296 B1* | 1/2010 | Brunner et al. | 705/26.5 |
| 7,865,344 B2* | 1/2011 | Wozniak | 703/13 |
| 7,970,720 B1* | 6/2011 | Heidenreich et al. | 706/45 |
| 2002/0010655 A1 | 1/2002 | Kjallstrom | |
| 2002/0107749 A1 | 8/2002 | Leslie et al. | |
| 2002/0143653 A1 | 10/2002 | DiLena et al. | |
| 2002/0166089 A1 | 11/2002 | Noy | |
| 2004/0019852 A1 | 1/2004 | Purvis | |
| 2004/0054692 A1* | 3/2004 | Seyrat et al. | 707/104.1 |
| 2004/0111327 A1 | 6/2004 | Kidd et al. | |
| 2005/0044525 A1 | 2/2005 | Lazarov | |
| 2005/0097437 A1* | 5/2005 | Green et al. | 715/500.1 |
| 2005/0198621 A1 | 9/2005 | Tillmann et al. | |

(Continued)

OTHER PUBLICATIONS

Frühwirth, Thom et al., "Principles of Constraint Systems and Constraint Solvers", Archives of Control Sciences: Special Issue on Constraint Programming, 16(2) http://www.informatik.uni-ulm.de/pm/mitarbeiter/fruehwirth/Papers/acs-systems3.pdf, 2006.

(Continued)

*Primary Examiner* — Fateh Obaid (74) *Attorney, Agent, or Firm* — Miles & Stockbridge P.C.

(57) ABSTRACT

A constraint based product configurator determines a structure that is adapted to be associated with one or more components and determines if an arbitrary association is possible for the structure. If an arbitrary association is possible, the configurator associates a component with the structure and generates a component association choice for the association. The component association choice is an identity of the structure and the corresponding first component.

15 Claims, 8 Drawing Sheets

(56) References Cited

U.S. PATENT DOCUMENTS

| | | | |
|---|---|---|---|
| 2005/0278271 A1* | 12/2005 | Anthony et al. | 706/919 |
| 2006/0184468 A1 | 8/2006 | Adir et al. | |
| 2007/0094184 A1 | 4/2007 | Emek et al. | |
| 2007/0112609 A1 | 5/2007 | Howard et al. | |
| 2007/0294270 A1* | 12/2007 | Gregory et al. | 707/100 |
| 2008/0114710 A1* | 5/2008 | Pucher | 706/20 |
| 2008/0228657 A1 | 9/2008 | Nabors et al. | |

OTHER PUBLICATIONS

Lhomme, Olivier, "Consistency Techniques for Numerics CSPs", Proceedings in IJCAI-93 pp. 232-238, 1993 Chambery, France.

Selectica, "Selectica Configuration", Solution Overview, 2005, Selectica, Inc., San Jose, CA.

ILOG, "ILOG Configurator, Powering online product and service configuration applications", Product Datasheet, Mar. 2005, ILOG.S.A.

Oracle, "Oracle Configurator", Oracle Data Sheet, 2008, Oracle.

Tacton, "Tacton's Sales Configurator—Bridging the gap between engineering and sales for selling customized products,", http://www.tacton.com/templates/page_68.aspx?epslanguage=EN, 2007, Tacton Systems AB, Sweden.

Benhamou, Frédérick et al., "Applying Interval Arithmetic to Real, Integer and Boolean Constraints", Journal of Logic Programming, 32(1), 1997.

Sabin, Daniel et al., "Configuration as Composite Constraint Satisfaction", Proceedings of the ($1^{st}$) Artificial Intelligence and Manufacturing Research Planning Workshop, 1996.

Fleischanderl, Gerhard et al., "Configuring Large Systems Using Generative Constraint Satisfaction", IEEE, pp. 59-68, No. 1094-7167/98, Jul./Aug. 2008, IEEE.

Mittal, Sanjay et al., "Dynamic Constraint Satisfaction Problems", Proceedings of the Eighth National Conference on Artificial Intelligence, 1996.

Stumptner, Markus et al., "Generative Constraint-Based Configuration of Large Technical Systems", Artificial Intelligence for Engineering Design, analysis and Manufacturing, pp. 307-320, No. 12, 1998, Cambridge University Press, USA.

Gelle, Esther et al., "Solving Methods for Conditional Constraint Satisfaction", IJCAL, 2003.

* cited by examiner

INTERACTIVE PRODUCT CONFIGURATOR WITH PERSISTENT COMPONENT ASSOCIATION

RELATED APPLICATIONS

This application claims the benefit of U.S. Provisional Application No. 61/087,254, filed Aug. 8, 2008.

FIELD OF THE INVENTION

One embodiment is directed generally to computer interaction, and in particular to an interactive product configurator.

BACKGROUND INFORMATION

Many current products and services can be customized by a user/customer before being purchased. For example, computer systems typically include many possible options and configurations that can be specifically selected or configured by the customer. Other examples of highly configurable products and services include telephone switching systems, airplanes, automobiles, mobile telephone services, insurance policies, and computer software.

Product and service providers typically provide a "product configurator" that allows a customer or sales engineer to interact with a computer in order to customize and configure a solution by selecting among optional choices. Some known product configurators are constraint based. For these configurators, constraints are enforced between optional choices, allowing the user to select the choices they want, while validating that the resulting set of user choices is valid.

When configuring a system, a user must typically choose a list of one or more components. Each component may then be associated with another component/structure. The association may be done by the user or may automatically be done by the configurator. For example, when configuring a computer system, a computer rack may be chosen that includes slots, and a computer card may be chosen. The computer card should be placed in one of the slots, and therefore will be associated with one of the slots on the rack. In another example, when configuring an airplane, a fuselage may be chosen, and a particular seat may be chosen, and the seat will be associated with a certain seating portion of the fuselage.

SUMMARY OF THE INVENTION

One embodiment is a constraint based product configurator. The configurator determines a structure that is adapted to be associated with one or more components and determines if an arbitrary association is possible for the structure. If an arbitrary association is possible, the configurator associates a component with the structure and generates a component association choice for the association. The component association choice is an identity of the structure and the corresponding first component.

DETAILED DESCRIPTION

One embodiment is a constraint based interactive configurator that automatically associates some components with other components or other structure through inferences. If a user retracts some choices, the associations persist, if possible, so that the configuration appears stable to the interactive user.

Figure 1:
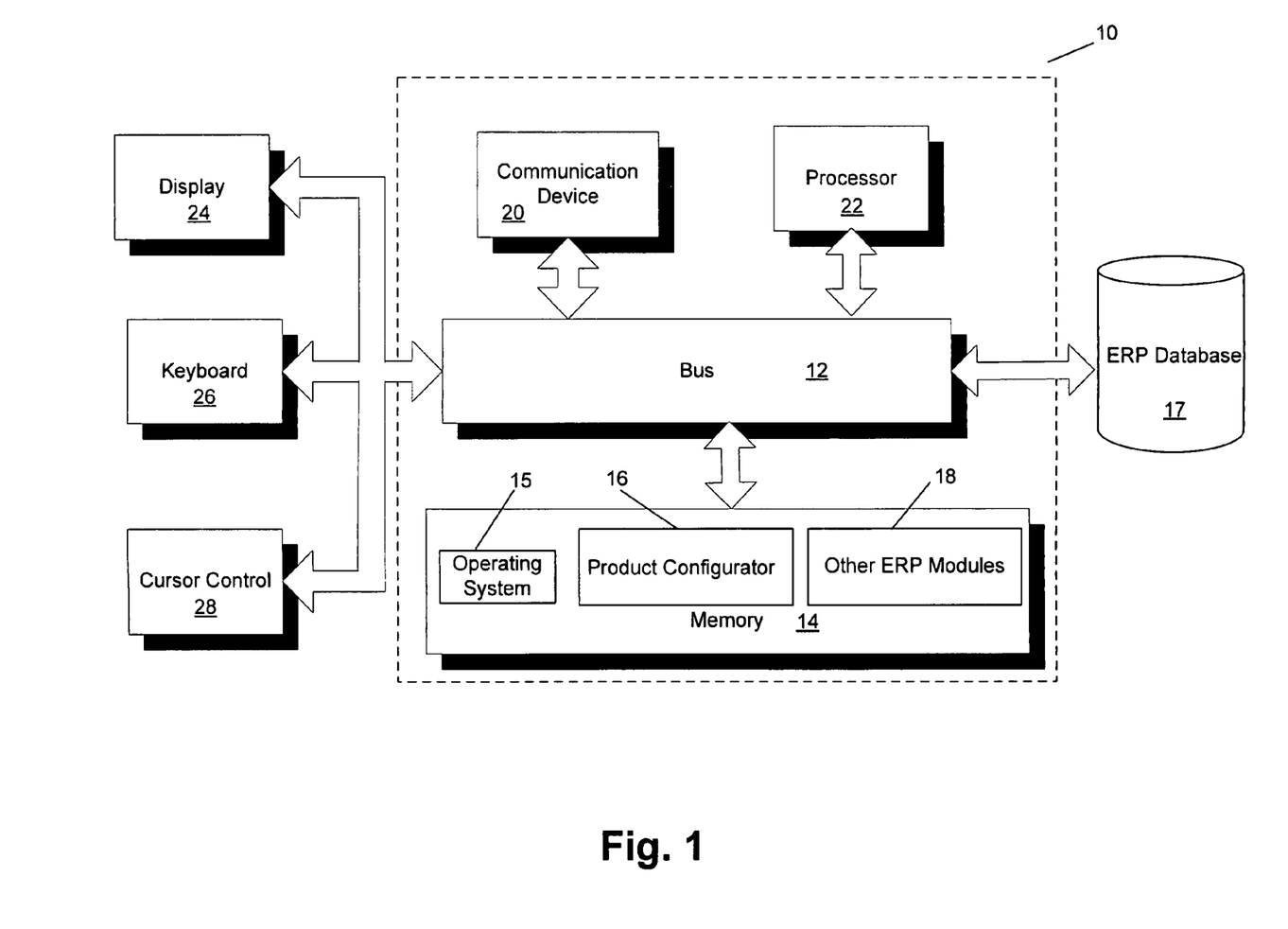
FIG. 1 is a block diagram of a system that can implement an embodiment of the present invention.

FIG. 1 is a block diagram of a system 10 that can implement an embodiment of the present invention. System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media. System 10 further includes a communication device 20, such as a network interface card, to provide access to a network. Therefore, a user may interface with system 10 directly, or remotely through a network or any other method.

Computer readable media may be any available media that can be accessed by processor 22 and includes both volatile and nonvolatile media, removable and non-removable media, and communication media. Communication media may include computer readable instructions, data structures, program modules or other data in a modulated data signal such as a carrier wave or other transport mechanism and includes any information delivery media.

Processor 22 is further coupled via bus 12 to a display 24, such as a Liquid Crystal Display ("LCD"), for displaying information to a user. A keyboard 26 and a cursor control device 28, such as a computer mouse, is further coupled to bus 12 to enable a user to interface with system 10.

In one embodiment, memory 14 stores software modules that provide functionality when executed by processor 22. The modules include an operating system 15 that provides operating system functionality for system 10. The modules further include a product configurator 16 that performs interactive product configuration as disclosed in more detail below. The modules further include other enterprise resource planning ("ERP") modules 18 of an ERP system that may interact with product configurator 16, such as a bill of material ("BOM") module and a customer relationship manager ("CRM") module. An ERP system is a computer system that integrates several data sources and processes of an organization into a unified system. A typical ERP system uses multiple components of computer software and hardware to achieve the integration. A unified ERP database 17, coupled to bus 12, is used to store data for the various system modules. In one embodiment, ERP modules 18 are part of the "Oracle E-Business Suite Release 12" ERP system from Oracle Corp. In other embodiments, product configurator 16 may be a standalone system and not integrated with an ERP system, or may be part of any other integrated system.

In one embodiment, product configurator 16 allows a user to interactively configure a product or service by choosing options. Product configurator 16 in one embodiment is constraint based in that it solves a constraint problem to arrive at a solution (i.e., an appropriate and valid configuration). A constraint problem is a problem with a given set of variables, a given set of values or range of values (referred to as a "domain") for each variable, and a given set of constraints. Each constraint restricts the values, from the set of values, that may be simultaneously assigned to each variable of the set of variables. The solution is a combination of assignments of values to each variable that is consistent with all constraints.

A configuration "model" is created in order to implement a configurator. A model represents a generic framework of a solution, or of many possible solutions, to a problem, and includes a classification of associated model entities. The model entities are referred to as "nodes" and represent the domains of the constraint based system. A model may represent an apparatus, such as an automobile, with various option packages; a system such as a telecommunications network, with various hardware, software, protocol and service options; a suite of available services; a suite of software applications, etc. A constraint network is a series of nodes linked by constraints.

When a model is created and executed by product configurator 16, a user can interact with the model. The interaction in general involves the user being presented with a series of choices or items. Each item is represented by a variable in the underlying constraint system. Each variable has a domain, which is a range or set of possible values (e.g., integers between 0 and 10, the set of blue, red or green, etc.). As choices/decisions are made by the user, the domain may shrink. For example, if the configurator is for a car, the user may choose a sedan instead of a convertible. However, in the next choice, which is the color of the car, red may no longer be available because a sedan cannot be configured in red.

In one embodiment, the constraint problem is considered "dynamic" because it includes components that can dynamically contain or connect to other components. For example, the number and types of the components may be unknown initially, to be determined based on the user's choices. As the user refines their requirements, the configurator will introduce components as necessary. Sometimes, the user may explicitly require the existence of a component; for example, "I want a printer with my computer system." Alternatively, the user may make a choice that implies or infers a requirement for a component; for example, "I want to use my computer for video editing" implies that the computer must have a large hard drive. Examples of how a user choice/decision can be expressed when interacting with product configurator 16 include clicking a checkbox, entering a number in a box, choosing a number or choice within a drop down box, etc.

In one embodiment, product configurator 16 draws all feasible inferences from the user's choices substantially immediately, both to give the user feedback about the consequences of their choices, and also to limit the remaining solution space as much as possible. With inferred components, feasible inferences include creating the necessary components and associating them with existing components/structure.

Figure 2:
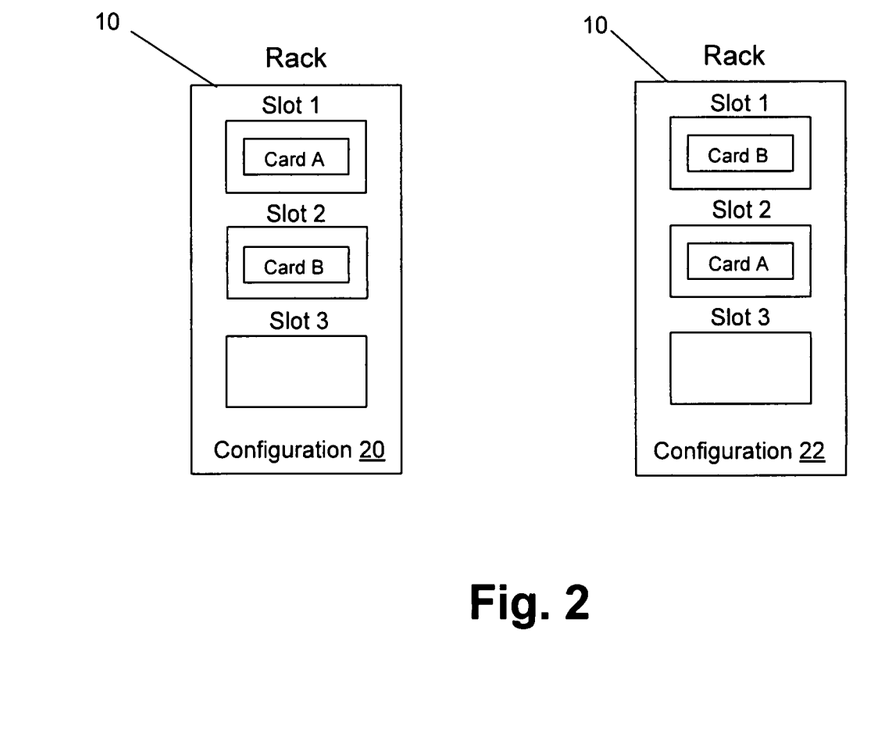
FIG. 2 is a block diagram of a computer system that can be configured using a product configurator.

Dynamic constraint problems involving the generation and placement of components often exhibit symmetry under the interchange of component associations. For example, FIG. 2 is a block diagram of a computer system that can be configured using product configurator 16. The computer system includes a rack 10 that includes three slots that are adapted to receive computer cards. If a configuration consisting of card A in slot 1 and card B in slot 2 satisfies a given set of requirements (configuration 20), it is possible that the configuration consisting of card B in slot 1 and card A in slot 2 is equally satisfactory (configuration 22). This symmetry introduces a degree of arbitrariness to the way in which inferences involving component existence and association are exhibited during an interactive configuration session. Having determined, for instance, that card A is required in the configuration, a product configurator may reasonably place it in slot 1, even though it may also place it in slot 2.

When interacting with a product configurator, a user may make choices that require the existence of some set of components which have been placed into the configuration with valid but arbitrary associations given the problem's symmetry. If the user changes their mind about some of those choices, the product configurator must be able to retract the inferences due to those choices. Often, this cannot be done without also retracting some inferences due to choices that have not been changed. Those inferences must then be restored. In one embodiment, product configurator 16 maintains the stability of the view of the partial configuration presented to the interactive user, to preserve those arbitrary associations that were made previously, if they are still valid.

Figure 3:
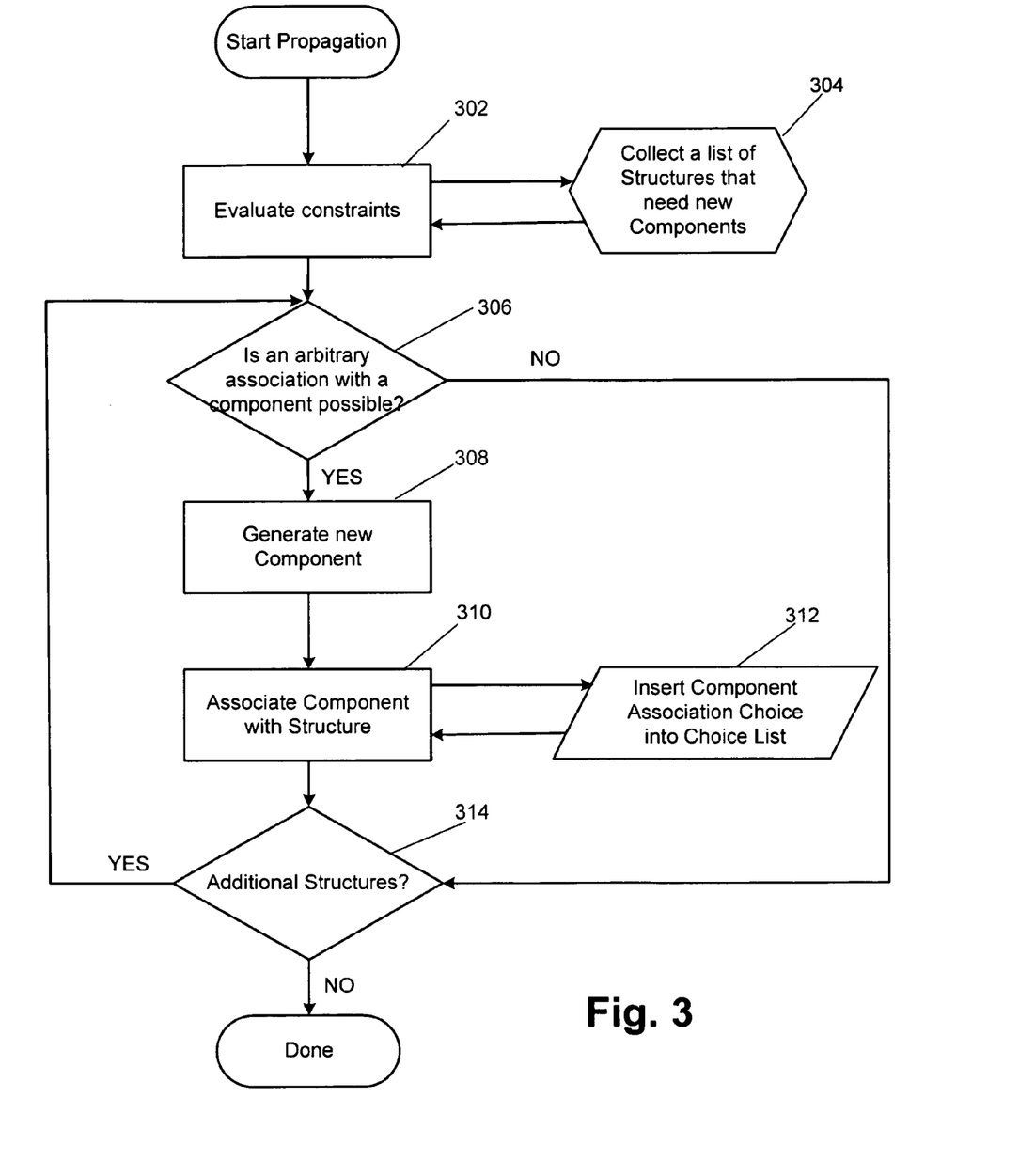
FIG. 3 is a flow diagram of the functionality of the product configurator when recording the arbitrary associations of a component together with the user's choices in accordance with one embodiment.

In one embodiment, in order to maintain the stability of the view of the partial configuration, product configurator 16 stores/records the arbitrary associations of a component to a structure within a configuration, and maintains those associations whenever possible during the interactive configuration process, even when problem symmetry permits alternate configurations. A "structure" may be any object in a configuration that can be associated with any other object, such as a component, a slot or port in a rack, etc. FIG. 3 is a flow diagram of the functionality of product configurator 16 when recording the arbitrary associations of a component together with the user's choices in accordance with one embodiment. The functionality of FIG. 3 is executed in one embodiment during an initial propagation of the constraint network or during the propagation of a new user choice. In one embodiment, the functionality of the flow diagram of FIG. 3, and FIG. 5 below, is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

At 302, as a result of the initial propagation or a propagation in response to a new user choice, the constraints of the network are evaluated. The evaluation includes collecting a list of structures that need new components at 304. For example, if the product was a computer system with racks having slots, the list of slots that needed cards would be collected at 304.

At 306, for the first structure on the list, it is determined if an arbitrary association with a component is possible. If not, the functionality moves to 314.

If an arbitrary association is possible at 306, a new component is generated at 308 and at 310 that component is associated with the structure. At 312, a corresponding component association choice is inserted in the choice list. The choice list is the list of choices, either selected by the user or selected by the configurator, that are generated by the user interaction with product configurator 16. The corresponding component association choice is a representation of the association of the component with the structure that can be stored in memory for later reference.

At 314, it is determined if there are additional structures in the list. If yes, the functionality continues at 306 with the next structure in the list.

Figure 4:
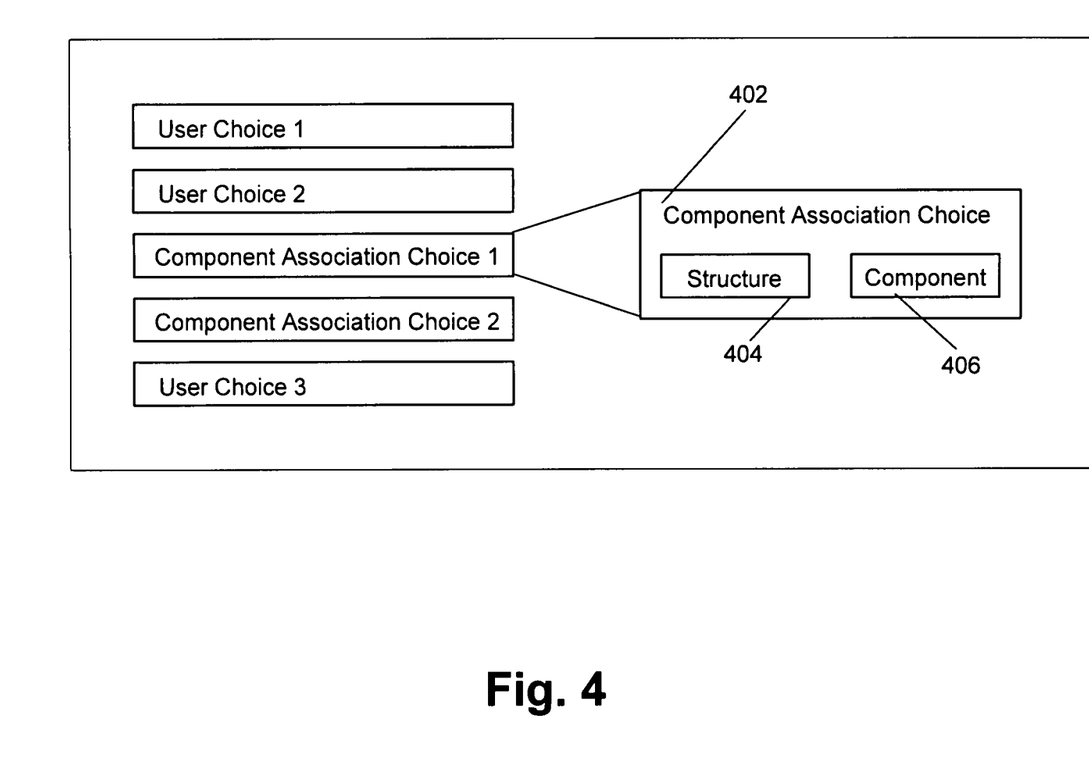
FIG. 4 graphically illustrates the functionality of FIG. 3 after three user choices in accordance with one embodiment.

FIG. 4 graphically illustrates the functionality of FIG. 3 after three user choices in accordance with one embodiment. The choices are listed from top to bottom in chronological order. After each user choice, the functionality of FIG. 3 is executed in one embodiment. As shown in FIG. 4, two arbitrary associations were determined to be possible at 306 of FIG. 3 after user choice 2: Component Association Choice 1 and Component Association Choice 2. For each component association choice, a component association is stored. In one embodiment, each component association storage data 402 includes the component 406 and its corresponding structure 404.

Figure 5:
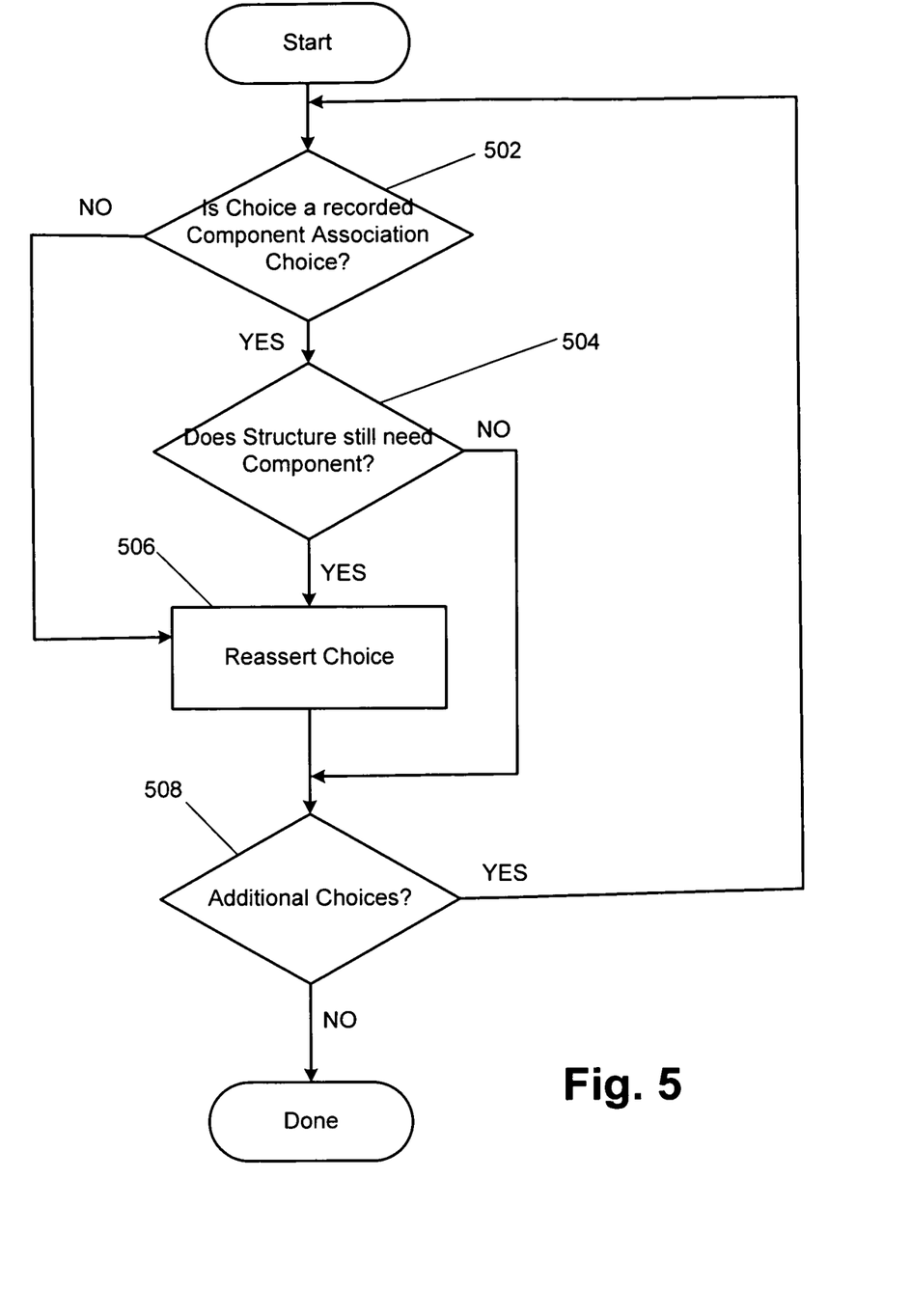
FIG. 5 is a flow diagram of the functionality of the product configurator in accordance with one embodiment when one or more user choices need to be removed due to, for example, a user changing their mind about previous decisions.

FIG. 5 is a flow diagram of the functionality of product configurator 16 in accordance with one embodiment when one or more user choices need to be reasserted after they have been removed due to, for example, a user changing their mind about previous decisions. In one embodiment, the configuration state is first rolled back to what it was before the decisions. The decisions made later by the user (which the user has no intention to change) are then reasserted. During the rollback phase, associations of a component may be undone. During the reassertion phase, the recorded associations of a component are reevaluated and reasserted if they are still valid.

At 502, for each choice on the list to be reasserted, it is determined if the choice is a component association choice, such as Component Association Choice 1 of FIG. 4. The choices will be reasserted in the reverse chronological order than they were rolled back. If yes at 502, it is determined if the structure of the component association choice still needs a component at 504. If yes at 504, the choice is reapplied/reasserted. If no at 502, functionality resumes at 506. If no at 504, functionality resumes at 508.

At 508, it is determined if there are additional choices on the list. If yes, functionality resumes at 502. If no at 508, the functionality is done. The functionality of FIG. 5 maintains the recorded association of components, if possible.

Figure 6:
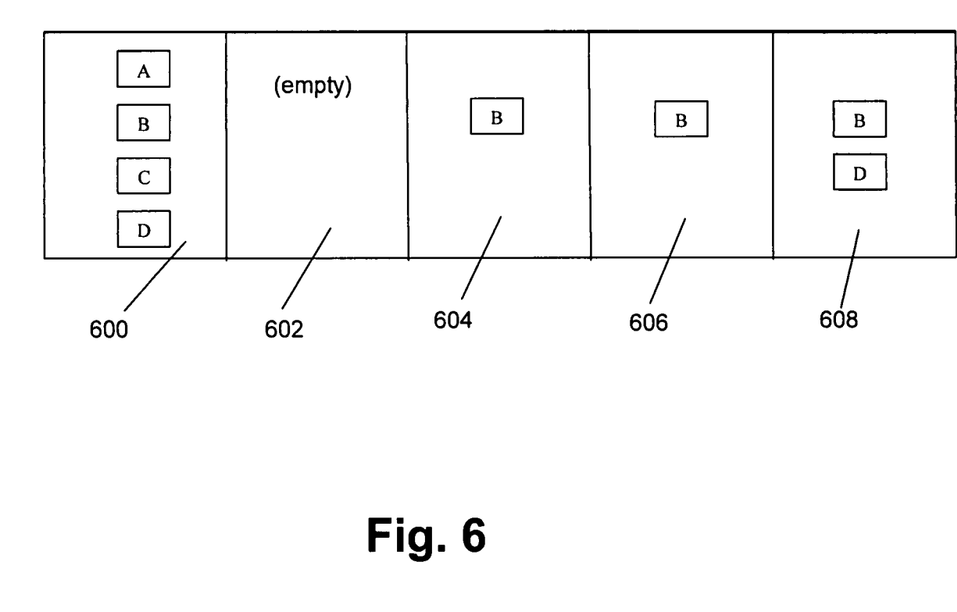
FIG. 6 graphically illustrates the functionality of FIG. 5 in accordance with one embodiment.

FIG. 6 graphically illustrates the functionality of FIG. 5 in accordance with one embodiment. At 600, the original list of choices is shown. Choice A and choice B are user choices. Choice C and choice D are component association choices (i.e., arbitrary choices made by product configurator 16). In this example, the user has decided to remove user choice A.

At 602, the choices are rolled back to before choice A, and choices B, C and D are ready to be reasserted.

At 604, choice B is reasserted.

At 606, since choice C is a component association choice, it is examined at 504 of FIG. 5. In the example of FIG. 6, it is determined that it is not needed, so it is not reasserted.

At 608, since choice D is a component association choice, it is examined at 504 of FIG. 5. In the example of FIG. 6, it is determined that it is needed, so it is reasserted.

Figure 7:
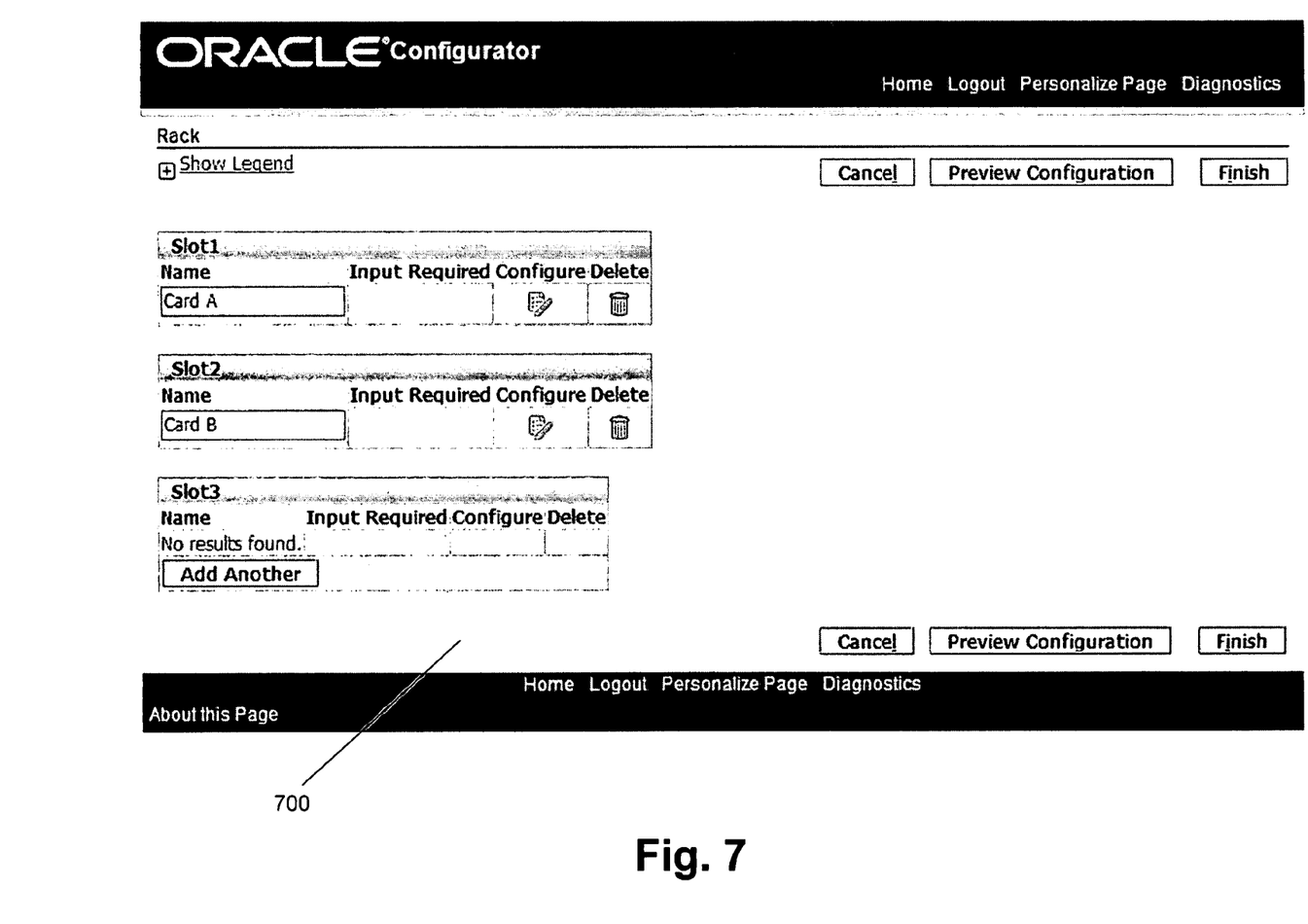
FIGS. 7 and 8 are user interfaces that illustrate the impact of embodiments of the present invention on a user of the product configurator in comparison to prior art.
Figure 8:
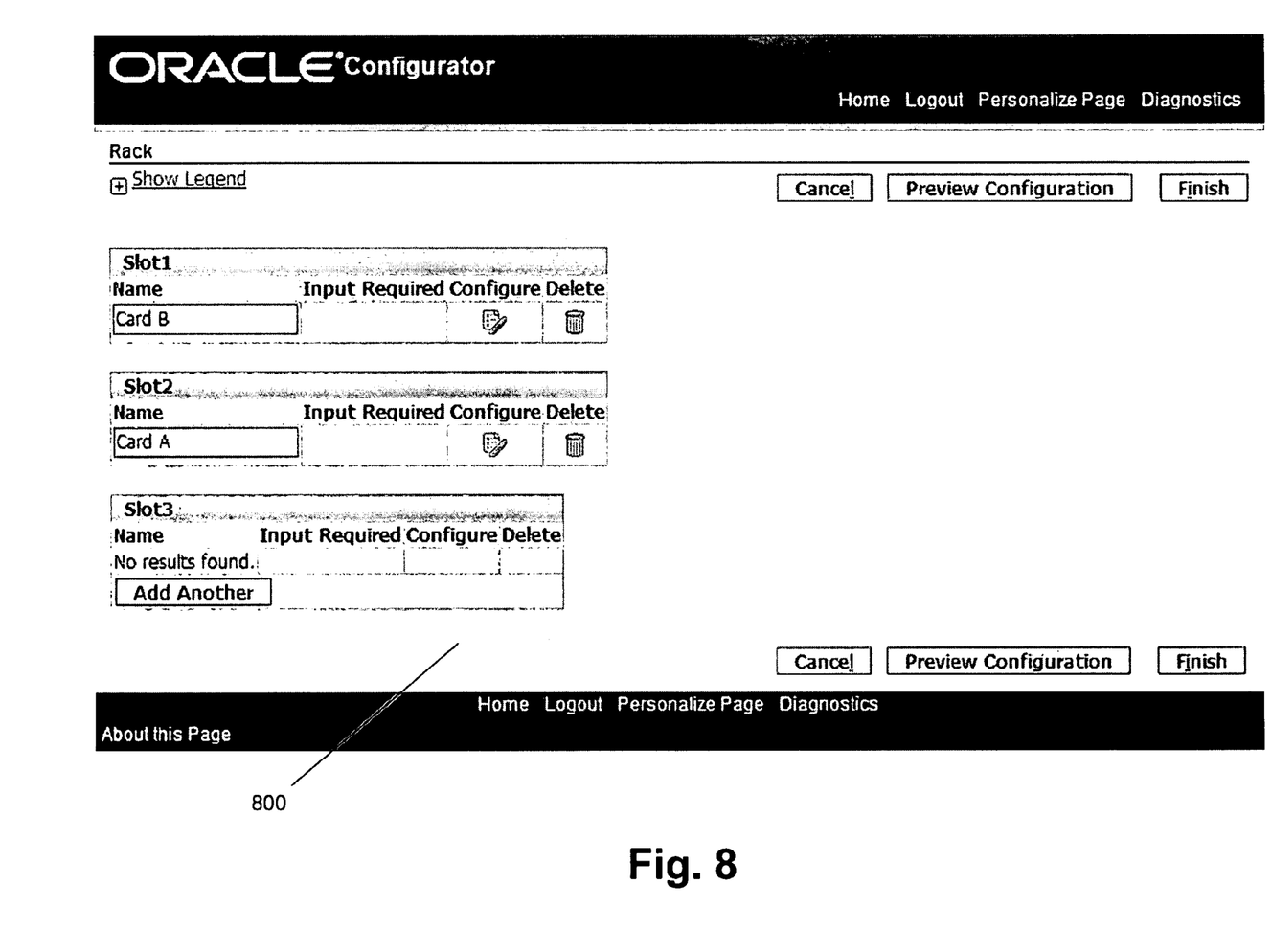

FIGS. 7 and 8 are user interfaces ("UI") 700 and 800, respectively, that illustrate the impact of embodiments of the present invention on a user of product configurator 16 in comparison to prior art. Assuming that after some number of user choices, component association choices were generated so that Card A is placed in Slot 1 and Card B is placed in Slot 2. If the user later removes one or more of the user choices, product configurator 16 will roll back choices to the removed choice, and then reassert the choices while maintaining the associations of components and structure if possible. Therefore, after the removal of the user choices, the user will likely continue to view Card A and Card B in Slot 1 and Slot 2, respectively, as shown in FIG. 7. In contrast, prior art configurators typically do not take steps to ensure that associations are maintained. Therefore, a user may, after removing one or more choices, view Card B now in Slot 1 and Card A now in Slot 2 as shown in FIG. 8. Therefore, in embodiments of the present invention the stability of the configuration during the interactive configuration process is maintained in contrast to prior art configurators and the association of structure and component is persistent.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A method of operating by a processor a constraint based product configurator comprising a plurality of constraints and variables, the method comprising:
    receiving a user choice during an interactive configuration session;
    subsequent to the user choice during the interactive configuration session, determining by the processor a structure that is adapted to be associated with one or more components;
    determining by the processor if an arbitrary association is possible for the structure, wherein the arbitrary association is possible when alternative configurations for the structure and components are available, and each of the alternative configurations comprise an assignment of a value to a variable that satisfies all of the constraints of the configurator;
    if an arbitrary association is possible, associating by the processor a first component with the structure by assigning the value to the variable;
    generating by the processor and storing in a memory a component association choice for the association, wherein the component association choice is an identity of the structure and the corresponding first component;
    receiving a request to remove the user choice;
    removing the arbitrary association before removing the user choice; and
    after removing the user choice and when the arbitrary association continues to be possible for the structure, reasserting the arbitrary association based on the stored component association choice so that the first component is again associated with the structure.

2. The method of claim 1, wherein the configurator comprises a constraint network having a plurality of nodes.

3. The method of claim 1, wherein the associating is based on an inference.

4. The method claim 1, further comprising a user interface that displays the association of the first component with the structure.

5. The method of claim 1, wherein the structure is a second component.

6. The method of claim 1, wherein a product to be configured is a computer rack, and the structure is a slot and the first component is a card.

7. A non-transitory computer readable medium having instructions stored thereon that, when executed by a processor, causes the processor to function as a constraint based product configurator, the configurator comprising:
    in response to a propagation of a user choice during an interactive configuration session and subsequent to the user choice, determining a structure that is adapted to be associated with one or more components;

determining if an arbitrary association is possible for the structure, wherein the arbitrary association is possible when alternative configurations for the structure and components are available, and each of the alternative configurations comprise an assignment of a value to a variable that satisfies all of the constraints of the configurator;

when an arbitrary association is possible, associating a first component with the structure by assigning the value to the variable;

generating and storing in a memory a component association choice for the association, wherein the component association choice is an identity of the structure and the corresponding first component;

receiving a request to remove the user choice;

removing the arbitrary association before removing the user choice; and after removing the user choice and when the arbitrary association continues to be possible for the structure, reasserting the arbitrary association based on the stored component association choice so that the first component is again associated with the structure.

8. The computer readable medium of claim 7, wherein the configurator comprises a constraint network having a plurality of nodes.

9. A constraint based product configurator comprising:

a processor;

a computer-readable medium coupled to the processor and storing at least one module that is executed by the processor, the functionality of the module when executed comprising:

in response to a propagation of a user choice during an interactive configuration session and subsequent to the user choice, determining a structure that is adapted to be associated with one or more components;

determining if an arbitrary association is possible for the structure, wherein the arbitrary association is possible when alternative configurations for the structure and components are available, and each of the alternative configurations comprise an assignment of a value to a variable that satisfies all of the constraints of the configurator;

when an arbitrary association is possible, associating a first component with the structure by assigning the value to the variable;

generating and storing in the computer readable medium a component association choice for the association, wherein the component association choice is an identity of the structure and the corresponding first component;

receiving a request to remove the user choice;

removing the arbitrary association before removing the user choice; and after removing the user choice and when the arbitrary association continues to be possible for the structure, reasserting the arbitrary association based on the stored component association choice so that the first component is again associated with the structure.

10. The computer readable medium of claim 7, wherein the associating is based on an inference.

11. The configurator of claim 9, wherein the associating is based on an inference.

12. The computer readable medium of claim 7, further comprising a user interface that displays the association of the first component with the structure.

13. The configurator of claim 9, further comprising a user interface that displays the association of the first component with the structure.

14. The computer readable medium of claim 7, wherein a product to be configured is a computer rack, and the structure is a slot and the first component is a card.

15. The configurator of claim 9, wherein a product to be configured is a computer rack, and the structure is a slot and the first component is a card.

* * * * *